UNITED STATES PATENT OFFICE.

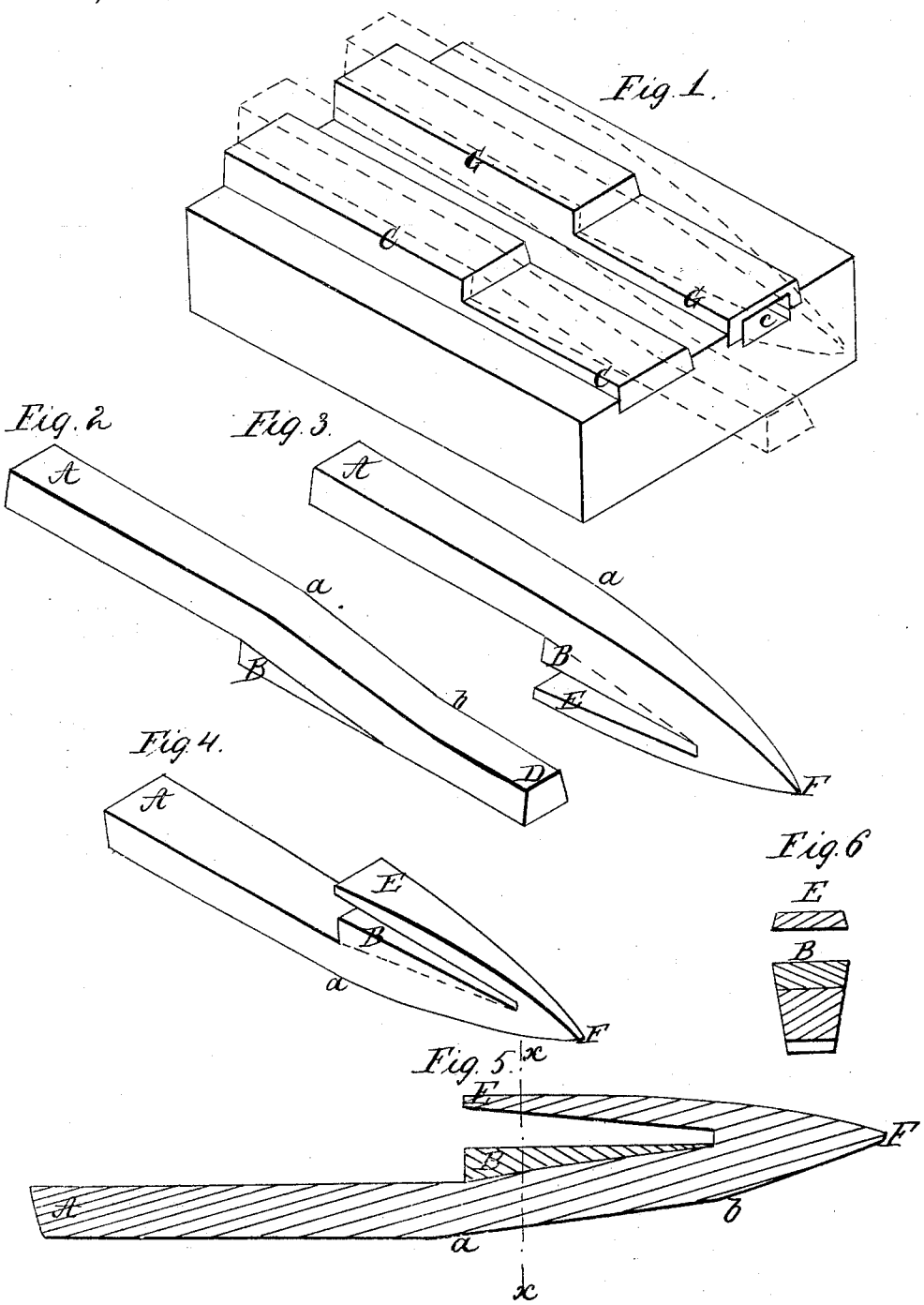

LEWIS MILLER, OF CANTON, OHIO, ASSIGNOR TO C. AULTMAN & CO., OF SAME PLACE.

IMPROVED FINGER OR GUARD FOR HARVESTERS.

Specification forming part of Letters Patent No. 20,243, dated May 11, 1858.

*To all whom it may concern:*

Be it known that I, LEWIS MILLER, of Canton, in the county of Stark and State of Ohio, have invented certain new and useful Improvements in the Manufacture of Guards or Fingers for Harvesting-Machines; and I do hereby declare the following to be a full, clear, and exact description of the same, reference being had to the accompanying drawings, making a part of this specification, in which—

Figure 1 represents a perspective view of the leveling and truing block, the guards or fingers in course of construction being represented thereon in red lines. Fig. 2 represents the blank or bar in its first advanced stage toward completion. Figs. 3 and 4 represent the finished guard in different positions. Fig. 5 represents a longitudinal vertical section through the finger or guard. Fig. 6 represents a vertical transverse section through the finger at the red line *x x* of Fig. 5.

Similar letters of reference, where they occur in the several figures, denote like parts of the guard in all of them.

The difficulty and expense of making the fingers or guards of harvesting-machines of wrought-iron has almost driven them out of use and compelled builders to the use of cast-iron, although the wrought fingers are so much better than the cast ones. The expense of the wrought fingers or guards arises from two causes: first, the amount of drawing down of the bar to bring it to its proper shape and still leave its larger dimensions of the suitable size, and, secondly, the difficulty of leveling and truing the fingers, so that when placed on the finger-bar they shall present a perfect surface for the cutter-bar to work on and a perfect line of openings under the caps of the fingers for the cutters to work in. These difficulties, as above mentioned, have almost driven the wrought guards out of use and compelled the use of cast guards, which have but one single quality to commend them— viz., that of being easily trued—while their liability to break by striking against interposing obstacles is frequent, and the introduction of a shearing-edge to act in connection with the moving cutters is by no means easily accomplished, as it is in the wrought guard.

The object of my invention is to overcome the difficulties heretofore existing in the making of wrought guards by saving the expense of drawing them down from a bar of the dimensions of the largest part of the guard or finger, and to true and level them by a simple mode that will leave them all of the same shape, size, and dimensions as those cast in a mold and as readily placed in line on the finger-bar as the cast guards, while they never or scarcely ever break by striking against obstacles in their path. Cheapness, of course, is a consideration in the purchase of a harvesting-machine, but much more so is its ability to withstand the work it is designed for without breaking down or giving way in the midst of a harvest, when the saving of the crop may depend upon the strength of the parts of the machine most exposed, as the fingers are, they being specially designed for the protection of the cutters and their action.

My invention consists not in the substitution of wrought for cast iron, but in the manufacture of the guard of wrought-iron—viz., by forming the shoulder on the guard by welding on a piece of iron or steel, instead of making said shoulder by drawing down the bar from it, and in making said fingers of uniform shape by leveling and truing them on a block after they are made and in the course of making, as will be explained.

To enable others skilled in the art to make and use my invention, I will proceed to describe the same by reference to the drawings.

The bars from which I make my guards are rolled out at the mill of a rhomboidal form and of the size necessary for the shank A of the guard or finger. Said bar being cut up into suitable lengths or blanks to form the guard, a triangular piece of iron or steel B is welded onto the top of the blank at the proper place to form the shoulder against which the cutter-bar reciprocates. The piece B is leveled and trued and the angles *a b* properly shaped and formed by placing the piece on the leveling-block C, as shown by the red lines in Fig. 1. The point D of the blank is then drawn down to the proper shape and size to form, when it is turned over, the cap E of said guard or finger, as also the point F thereof. When the guard or finger is thus wrought down to nearly its proper shape or form, it is placed on the leveling and truing block G, the cap E being slipped into or under the die, as at c, as shown in red lines in Fig. 1, and the finger is brought down at all points or parts to the truing-block by a hammer, and it is finished so far as its proportions are concerned, the point or surfaces being file-dressed or ground to a perfect finish.

When desired to make the finger act, as it were, as a part of the cutting apparatus, the piece B, that is welded on, may be of steel and wrought down to quite an acute angle at its edges, which form stationary shear-blades.

By this mode of making the guards they are not only very much cheapened, but are all of the same shape and form and can be replaced and matched without difficulty.

I am fully aware that in metallurgic operations shoulders or projections have been welded on instead of being drawn down from a large mass, and that articles have been formed and shaped in dies—as, for instance, in the making of anvils; but I do not claim a metallurgic operation as such, meaning only to claim the manufacture of a guard for a harvesting-machine, which when used in a series capacity shall have the effect hereinabove described in forming a perfect bearing for a cutter-bar.

Having thus fully described the nature and object of my invention, what I claim therein as new, and desire to secure by Letters Patent, is—

1. In the manufacture of guards for harvesters, forming the shoulder on a wrought-iron guard by welding on a piece instead of drawing down a large bar, as herein set forth, and for the purpose described.

2. The shaping, leveling, and truing of the guards or fingers, so as to make them of uniform shape and size, by means of a block, as herein described and represented.

LEWIS MILLER.

Witnesses:
    DANIEL GOTSHALL,
    ELI WAGNER.